United States Patent [19]

Escarrat

[11] Patent Number: 5,388,545
[45] Date of Patent: Feb. 14, 1995

[54] AIR VENTING DEVICE IN A CONTAINER SUBJECTED TO UNCONTROLLED OSCILLATIONS

[75] Inventor: Pierre Escarrat, Toulon, France

[73] Assignee: Etat Francais as represented by the Delegue General pour l'Armement, Paris, France

[21] Appl. No.: 166,001

[22] Filed: Dec. 14, 1993

[30] Foreign Application Priority Data

Dec. 17, 1992 [FR] France ................... 92 15266

[51] Int. Cl.⁶ ................................... B63G 8/32
[52] U.S. Cl. ...................... 114/316; 114/238; 220/745
[58] Field of Search .............. 114/333, 316–320, 114/335, 74 R, 211, 212, 125, 238; 405/192; 137/589; 220/745, 746; 89/1.809, 1.81

[56] References Cited

U.S. PATENT DOCUMENTS

| 1,414,560 | 5/1922 | Fat | 114/212 |
| 2,601,313 | 6/1952 | Merriam | 220/745 |
| 3,081,730 | 3/1963 | Dvorachek | 114/211 |
| 3,187,935 | 6/1965 | Lense | 220/86.2 |
| 3,967,633 | 7/1976 | Hallanger | 137/587 X |
| 4,261,477 | 4/1981 | Casimir et al. | 220/746 |
| 5,000,335 | 3/1991 | Osborne | 220/745 |

*Primary Examiner*—Sherman Basinger
*Attorney, Agent, or Firm*—Oliff & Berridge

[57] ABSTRACT

An air venting device is provided in a container with a sealed closure subjected to uncontrolled oscillations and designed to be filled by water. The air venting device includes an outside tube with a water presence indicator and an isolating valve to close off the outside tube in response to the water presence indicator and an inside tube with two open ends located at two different points in the container. One of the ends of the inside tube is fitted with a closure flap to close off the opening of the tube once the water in the container reaches a predetermined level through the action of a float. This end allows the air to enter even when the container is subjected to oscillations and so long as it is not completely full. This air venting device may be used in torpedo tubes of a submarine, for example.

5 Claims, 3 Drawing Sheets

AIR VENTING DEVICE IN A CONTAINER SUBJECTED TO UNCONTROLLED OSCILLATIONS

BACKGROUND OF THE INVENTION

1. Field of the Invention

This invention concerns containers designed to be filled with a liquid. More particularly the invention relates to an air vent device in a container with a sealed closure subjected to uncontrolled oscillation designed to be filled with a liquid.

2. Description of Related Art

A container of this type is the torpedo tube on board a submarine or any other type of missile launcher. The torpedo tube is submerged, and its operation necessitates balancing the pressure inside the tube with the surrounding environment (i.e., the water) before the two are connected together.

It is then necessary to vent the air from inside the tube as the water fills the tube through a filling orifice. For this purpose, the tube has two vent orifices located one at each end. Each one is associated with a circuit in which an isolating valve and a water presence indicator are placed in series. Any water ingress detected by the water presence indicator results in the closure of the isolating valves. Thus in normal conditions, when the tube is filled with water and the isolating valves have been closed, the tube filled with water at the same pressure as the surrounding environment (the sea) can be opened at one end to allow the torpedo to be launched.

Unfortunately, any change in the attitude of the launcher due to pitch or roll brings about a corresponding inclination of the tube. This inclination may then cause water accidentally to reach one or other of the water presence indicators and result in the closure of the isolating valve resulting in random venting of the air if there is oscillation of the launcher caused mainly by pitching.

SUMMARY OF THE INVENTION

The purpose of the invention is therefore to produce a device for purging air or any gas from a container designed to be filled with water or any liquid, which is insensitive to uncontrolled oscillation of the container.

Another purpose of the invention is to produce a device for purging air (or any gas) from a container designed to be filled with water (or any liquid) and subjected to uncontrolled oscillations, that makes it possible to fill the container completely before the filling process is interrupted in any abnormal way.

The subject of the invention is therefore a gas venting device in a container with a sealed closure subjected to uncontrolled oscillation and designed to be filled by a liquid, comprising a filling opening for introducing liquid to the container. The device according to the invention consists in a tube of which one part is inside and one part outside the container, the two parts being connected together, the inside part being normally open to allow the gas displaced by the liquid filling the container to enter the tube, and the outside part comprising a liquid presence indicator to detect the ingress of liquid and thus indicate that the container is filled by the liquid, and an isolating valve for closing the outside part of the tube in response to the liquid presence indicator. The part of the tube inside the container comprises at least two open ends located at different points in the container, at least one of the ends being fitted with a closure flap in order to close this end once the liquid reaches a predetermined level below the level necessary for it to enter the tube, so that the end allows gas to enter even when the container is subjected to uncontrolled oscillations and as long as the container is not completely filled by the liquid, such that the liquid presence indicator can never detect the presence of liquid before the container is completely filled.

BRIEF DESCRIPTION OF THE DRAWINGS

The objectives, subjects and other characteristics of the invention will be better understood from the following description which refers to the drawings wherein.

DETAILED DESCRIPTION OF PREFERRED EMBODIMENTS

Figure 1:
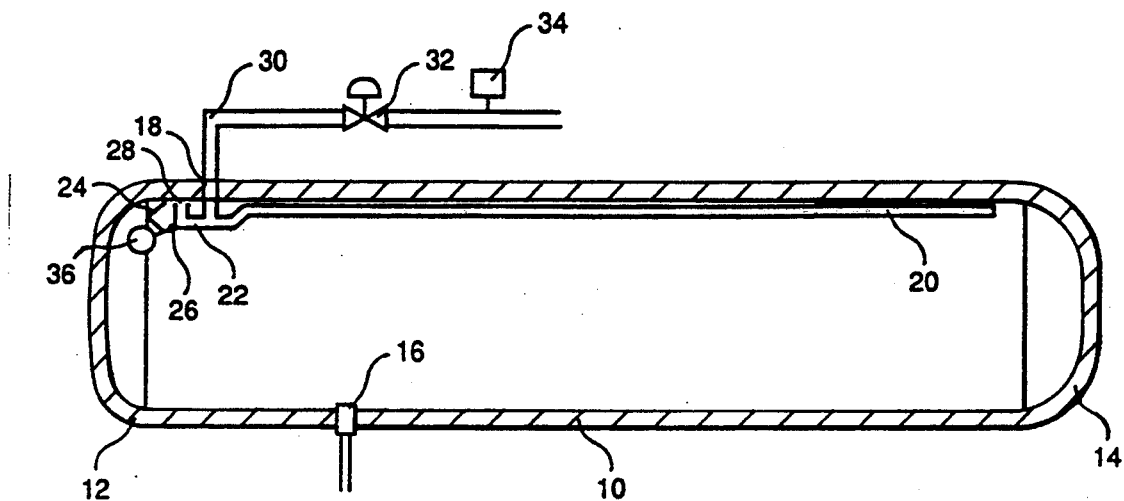
FIG. 1 shows a sectional view of a torpedo tube fitted with the air venting device according to the preferred embodiment of the invention.

The invention finds its best application in the torpedo tubes fitted to submarines or other warships. Such a torpedo tube is shown on FIG. 1. The tube 10 is fitted with a rear door 12 whereby the torpedo is inserted in the tube and a forward door 14 which is opened in order to launch the torpedo when the tube is filled with water. The tube is provided with a water filling orifice 16 through which the water enters the tube. It should be noted that the water is usually pressurised and may come either from the external environment (the sea) or from a source within the ship, and gravity filling can also be considered.

The container 10 comprises an air venting device in the form of a tube passing through the wall of the container at the wall penetration sleeve 18. This tube comprises one part inside the container consisting of a forward venting tube 20 open at its end and an after venting tube 22. The after venting tube 22 comprises a flap 24 which can move in rotation on the pivot 26, its function being to close off the open end 28 of the after venting tube 22 by means of the float 36.

The part of the venting device outside the container 10 comprises an air outlet tube 30 normally open at its end upon which are fitted an isolating valve 32 and a water presence indicator 34 in series. When the water presence indicator 34 detects the presence of water, this normally means that the container 10 is filled with water. In response to the detection of water by the water presence indicator 34, a hydraulic control (not shown) closes the isolating valve 32 so as to isolate the liquid contents of the container 10 from the air.

Figure 2:
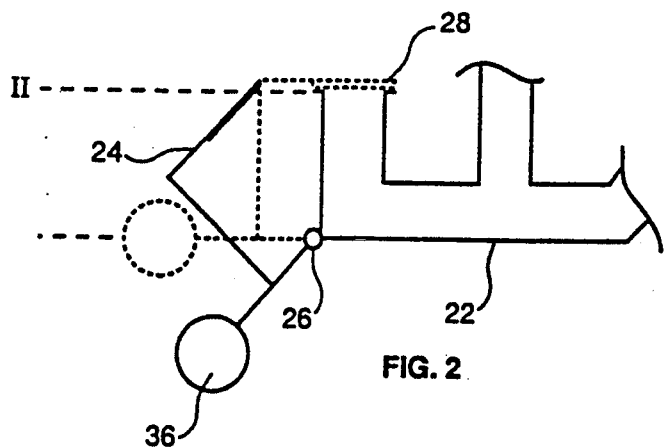
FIG. 2 illustrates the detail of the flap and rear venting tube of the air venting device according to the preferred embodiment of the invention.

As shown on FIG. 2, which gives a detailed illustration of the flap 24 which constitutes one of the essential characteristics of the invention, the flap 24 can move in rotation about the pivot 26 mounted at the end of the after vent tube 22. When there is no water in the torpedo tube, the flap 24 is in the open position as a result of the weight of the float 36 being in the down position. When the water rises in the tube, which is horizontal, the float 36 is driven upwards. When the water reaches the level I the flap 24 seals off the end 28 of the after vent tube 22. The level I is lower than the level II of the end 28 such that when the water rises, the flap 24 in the sealed shut position prevents the water from entering the after vent tube. This difference between the levels I and II is particularly useful when the torpedo tube is subjected to a changing attitude owing to uncontrolled oscillations, mainly pitch, as will be seen.

Figure 3:
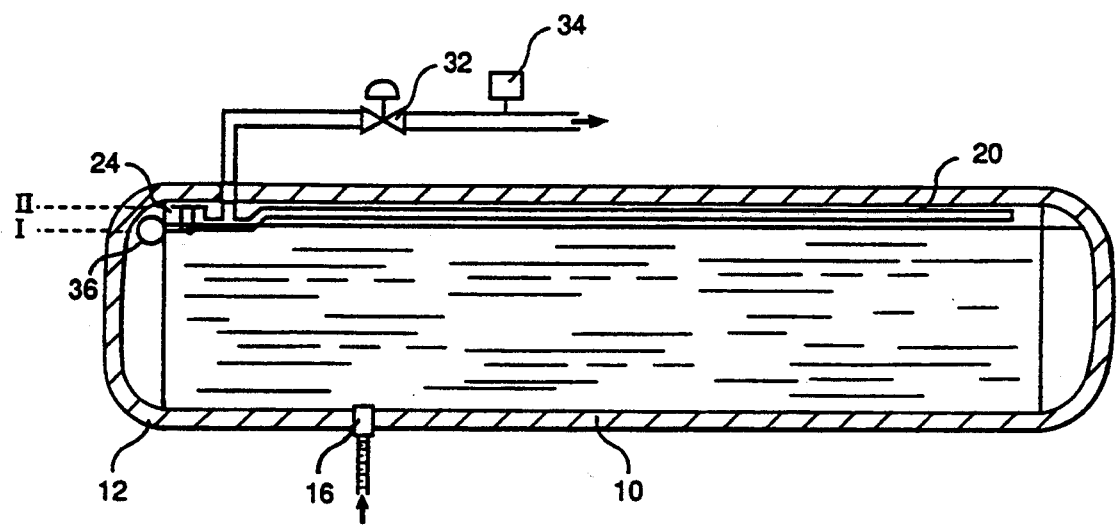
FIG. 3 shows the torpedo tube and its air venting device when the water reaches the top of the tube.

FIG. 3 illustrates the situation where the water reaches the top of the tube which is horizontal. As already indicated, when the water has reached the level I, which is below level II of the opening of the after vent tube, the flap 24 closes off the end of the after vent tube 22 by means of the float 36 being in the high position, thus preventing water from entering through this tube. Venting of the air is achieved through the forward vent tube 20, which is located at a position above levels I and II. When the water reaches the end of the forward vent tube 20, it enters the tube 20 and is detected by the water presence indicator 34, which then instructs the isolating valve 32 to close.

If the attitude of the torpedo tube varies during filling, the air may be vented either through the after vent tube 22 or through the forward vent tube 20.

Figure 4:
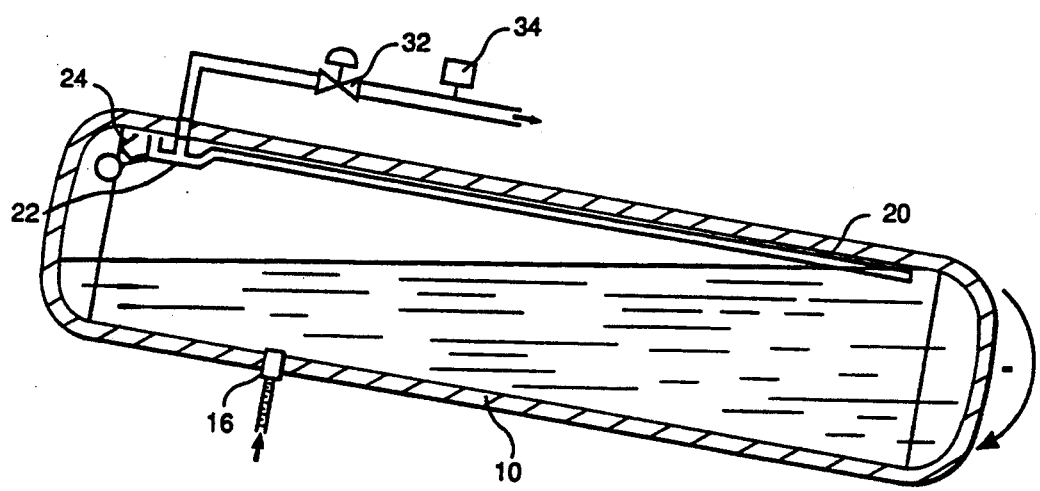
FIG. 4 shows the torpedo tube half filled with water showing a nose-down attitude.

As shown on FIG. 4, when the half-filled tube 10 has a nose-down attitude, the end of the forward vent tube 20 may find itself below the water level. In this case, air will continue to vent through the after vent tube 22 which is opened since the flap is not closing the end of the tube.

Figure 5:
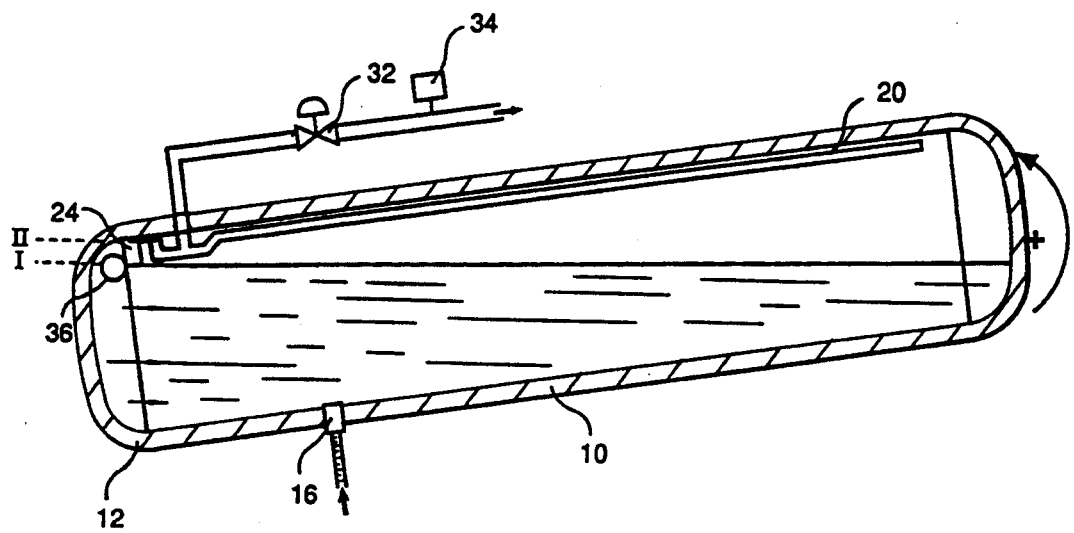
FIG. 5 shows the torpedo tube half filled with water showing a nose-up attitude.

On the other hand, in the case of a nose-up attitude shown on FIG. 5, it is the after vent tube 22 which closes first when the flap 24 closes the end of the tube because the float 36 has been driven upwards by the water level. In this case, the air is vented through the forward vent tube 20.

It must be noted that on completion of filling, a small volume of air may remain either at the front of the torpedo tube 10 or at the back, because the ingress of water into the after vent tube 22 or the front vent tube 20 in case of a nose-down or nose-up attitude respectively, takes place before the water has completely driven the air from the tube. This amount of air is extremely small and of no consequence.

Figure 6:
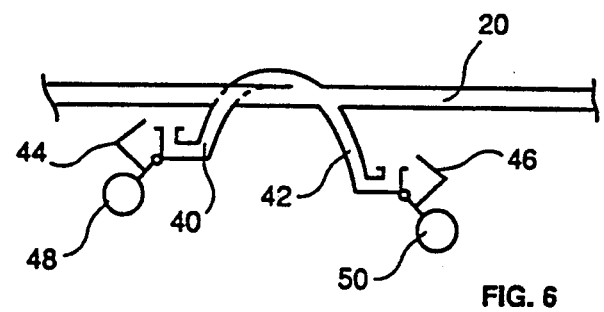
FIG. 6 shows an embodiment of the device according to the invention adapted to rolling motion.

In the above description, only nose-down or nose-up attitudes caused by the tube moving in pitch were considered. However, it is possible to devise a tube to accommodate transverse movements due to roll. It is sufficient to arrange, as shown on FIG. 6, two left-hand and right-hand transverse tubes 40 and 42, curved to match the shape of the torpedo tube wall, and connected to the front vent tube 20. Each of these transverse tubes 40 and 42 ends in a flap 44 or 46 each driven to the closed position as the water rises by a float 48 or 50. In this way, if the roll on completion of filling is so great that the front and after vent tubes are below the water level, one of the transverse tubes 40 or 42 is out of the water, which allows the air to continue to be vented from the tube.

Although the preferred embodiment of the invention is a torpedo tube in a submarine or other warship, the invention can be applied in all circumstances where a container (or any kind of tank) has to be filled with water at the same time as the air it contains is vented. Thus this operation is also necessary in a submarine or surface ship for the refuse discharge chambers or airlocks for military swimmers. Such airlocks can also be fitted with air venting devices according to the present invention.

Figure 7:
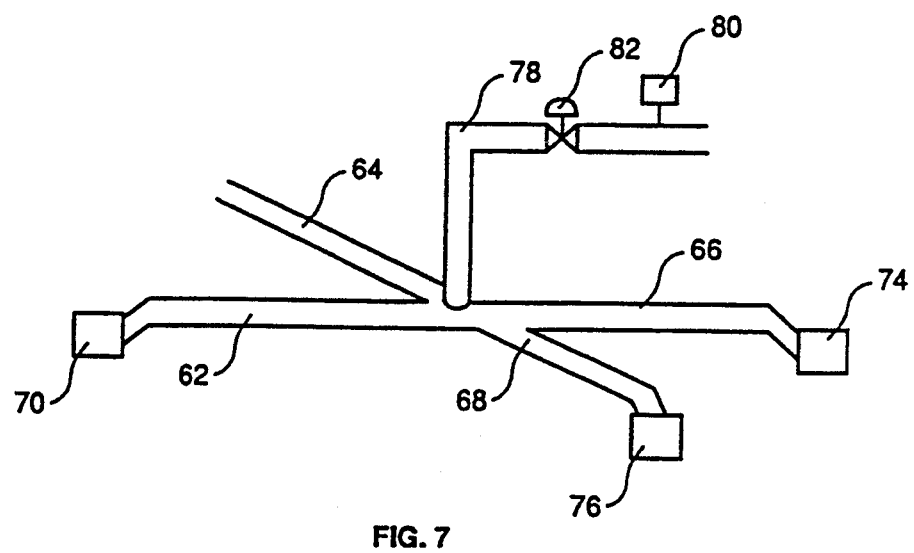
FIG. 7 shows an embodiment of the invention adapted to the filling of a fuel tank.

Similarly, venting takes place when the fuel bunker of a ship is filled. If the bunker is cylindrical or prismatic in shape with a top that is flat and not curved as in the case of the torpedo tube, the air venting device can be designed according to the illustration of FIG. 7. The lower part of the tube comprises four branches 62, 64, 66 and 68, of which three branches, 62, 66 and 68 are all closed at their end by a flap, 70, 74 and 76 respectively, identical with the one used in FIGS. 1 to 6, and the fourth branch 64 has no flap. If the fuel tank or bunker is subjected to oscillations in any direction during filling, the flaps on the branches which are so fitted close, preventing the liquid in most cases from being detected until the tank is full. Only the branch 64 of the tube which has no flap will allow liquid to pass. However owing to the fact that the tank is usually as high as it is wide, or higher than it is wide, the liquid entering the tube 78 is unable to reach the liquid presence detector 80 and cause the closure of the isolating valve 82 until the tank is substantially full, the volume of air then remaining being insignificant compared with the volume of the tank. It is also possible to reduce this volume of residual air by making the three branches fitted with flaps 62, 66 and 68 shorter than the branch without a flap 64. Although the device shown in FIG. 7 has four branches, it is possible to use three, five or more branches if this appears worthwhile.

As has been seen, the device according to the invention may be used with liquids other than water, such as fuel. It can also be used to vent a gas other than air. Similarly, the device can be used in all cases where the container which has to be filled with liquid is subjected to uncontrolled oscillations. Hence the container could be in any type of vehicle, whether a terrestrial vehicle or aircraft. The invention is clearly not limited to these cases, and any modifications may be made by the professional to adapt the invention to other applications without departing from the spirit of the invention.

I claim:

1. Gas venting device in a container with a sealed closure, wherein the container is a torpedo tube of a submarine or a missile launcher of a ship, subjected to uncontrolled oscillations and designed to be filled by a liquid comprising a filling orifice for introducing the liquid to the container, said device consisting of a tube of which one part is inside and one part outside the container and connected to one another, the inside part being normally open to allow the gas pushed back by the liquid filling the container to enter the tube, and the outside part comprising a liquid present indicator to detect the ingress of liquid and thus indicate that the container has been filled by the liquid, and an isolating valve to close off said outside part of the tube in response to the liquid presence indicator;

said device being characterized in that the part of said tube inside the container comprises at least two open ends located at different parts in the container, at least one of the ends being fitted with a closure flap to close off said end once the liquid reaches a predetermined level below the level necessary for it to enter said tube, in such a way that said end allows gas to enter even when the container is subjected to uncontrolled oscillations and so long as the container is not completely filled by the liquid, such that the liquid presence indicator can never detect the presence of liquid until the container is completely filled.

2. Device according to claim 1, characterized in that said closure flap is driven to close off the end of said tube by a float which can rotate at the end of said tube on a pivot.

3. Device according to claim 2 characterized in that said inside part of said tube has its other end open without a flap, the connection to said outside part being located near the end fitted with said flap of said inside part of said tube.

4. Device according to claim 1 characterised in that said inside part of said tube also comprises two transverse branches fitted with a flap at their ends, such that one of the ends of said tube is open and allows the gas to escape if rolling should submerge the other ends.

5. Device according to claim 1 characterized in that the liquid filling said tube is the outside water causing the air to vent from said tube.

* * * * *